May 31, 1955 F. W. SCHMIDT, JR 2,709,788

ADJUSTABLE COUPLING NETWORK

Filed June 17, 1950

INVENTOR.
FRED W. SCHMIDT, JR.
BY Darby & Darby
ATTORNEYS

United States Patent Office 2,709,788

Patented May 31, 1955

2,709,788

ADJUSTABLE COUPLING NETWORK

Fred W. Schmidt, Jr., Cedar Grove, N. J., assignor to Allen B. Du Mont Laboratories, Inc., Clifton, N. J., a corporation of Delaware Application June 17, 1950, Serial No. 168,832

5 Claims. (Cl. 333—70)

This invention relates broadly to frequency selective apparatus and more particularly to devices for adjusting the bandwidth of a television preselective tuner.

Television tuners for use in the very high frequency range and continuously tunable between the frequencies of 50 and 220 megacycles per second have been described in copending applications assigned to the present assignee, application Serial No. 688,356, filed August 3, 1946, by Paul Ware now Patent 2,511,185, issued June 13, 1950, and application Serial No. 51,728 filed September 29, 1948 by the present inventor, now Patent 2,661,459, issued December 1, 1953. In both these applications circuits for obtaining substantially constant bandwidth and constant stage gain over an unusually wide tuning range have been described. In the latter application constant bandwith was achieved at the upper end of the band by means of a series-tuned circuit self-resonant at a frequency somewhat higher than the highest frequency of tuning. The series resonant circuit there described comprised a capacitor of suitable value designed to be self-resonant with its leads at the proper frequency.

In producing large quantities of television tuners incorporating these circuits, it has been found that in spite of all precautions taken to insure uniformity of product, variations of bandwidth have occurred when fixed capacitors have been used. The cause of variation has been traced to minute differences in the self-inductance of these capacitors. It is accordingly an object of this invention to provide a means for compensating for these differences in the self inductance of capacitors in order to obtain a desirable uniformity of product.

It is another object to provide a self-resonant device the resonance of which is adjustable over a range.

It is a further object to provide a means for adjusting bandwidth to obtain uniformity of product.

It is a particular object to provide a means for adjusting the bandwidth of the high frequency tuning range of a television tunable band pass filter suitable for use at frequencies in the order of 200 megacycles per second and above.

The invention briefly is embodied in a high frequency resonant circuit having a structure mounting a fixed capacitive element in given relation to a chassis and a variable inductive element in electrical contact therewith, the latter being shaped to permit contact of different fractions of its area with said capacitive element, the invention embodying these features of construction and combinations of elements being useful in high frequency apparatus.

Figure 2:
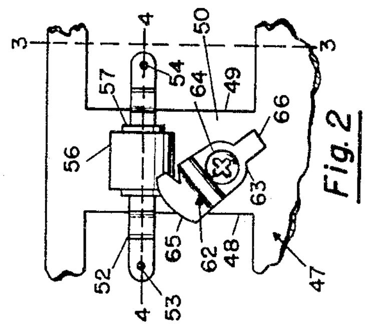
Figure 2 is a plan view of a portion of one embodiment of the invention.
Figure 3:
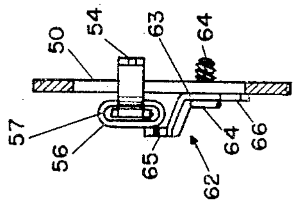
Figure 4:
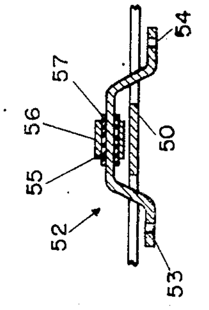

Figures 3 and 4 are sectional views through 3—3 and 4—4 of Figure 2, respectively.

Figure 1:
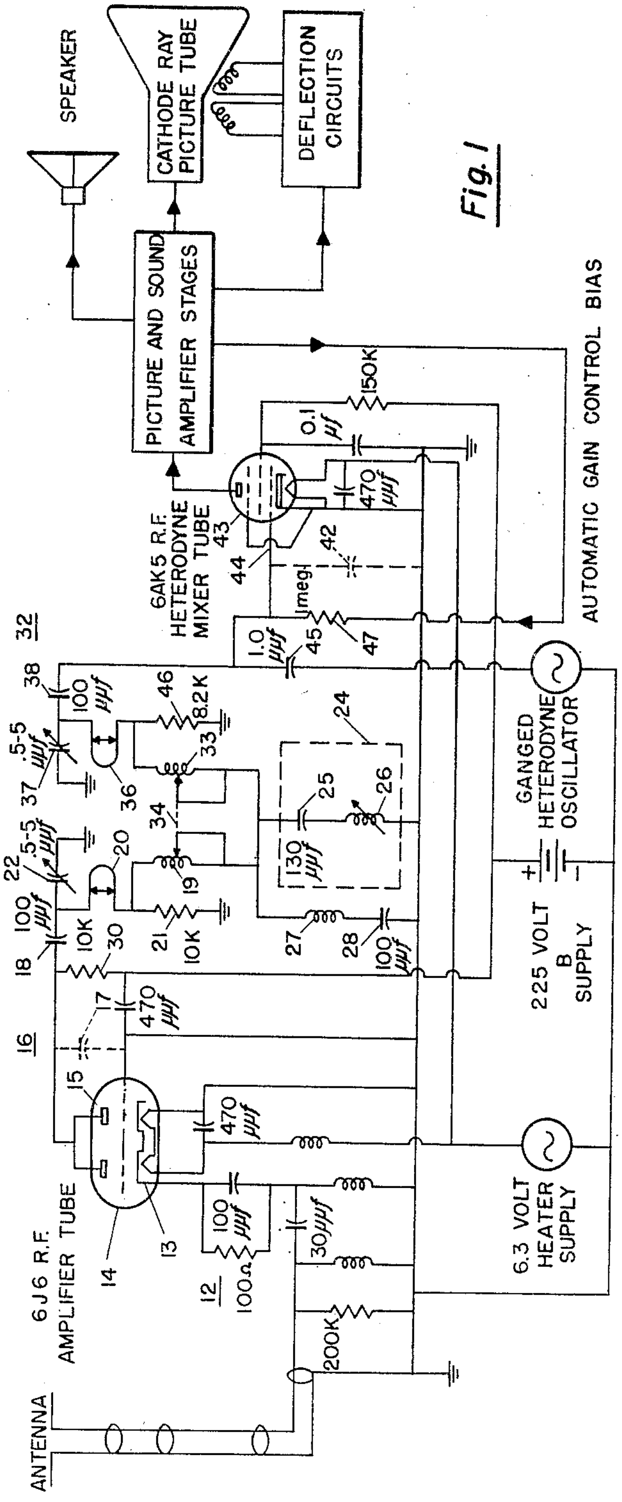
Figure 1 is a circuit diagram of a television receiver employing an embodiment of my invention.

Referring to Figure 1, the television receiver there shown contains an input coupling network 12 which transfers energy contained in a plurality of television channels in a pass band between 54 and 216 megacycles from the antenna where it is received to a cathode or input electrode 13 of a radio frequency amplifier tube 14 operative at these frequencies. The conductive chassis of the receiver is shown on the schematic diagram as a ground.

The anode or output electrode 15 of the amplifier tube 14 is connected to a primary tuner circuit 16 comprising in part the distributed self-capacitance to ground of the tube 14 and the other components in the primary circuit. This distributed capacitance is shown symbolically as a dotted capacitor 17. The circuit taking the output from electrode 15 of the amplifier tube 14 is coupled through capacitor 18 to tuning inductor 19 which is resonant with relatively fixed circuit capacitors at a plurality of the aforesaid television channels. Trimming inductor 20 and resistor 21 complete this coupling circuit. Trimming inductor element 20 is preferably of the type described in my copending application Serial No. 51,727, filed September 29, 1948, now abandoned.

Trimming capacitor 22 is used to compensate for variations in the effective capacitance 17 produced by changing of tubes, variations in manufacture, and similar mechanical variations in the circuit. The primary circuit is completed through a coupling network 24 outlined in broken lines, comprising a capacitor 25 and an adjustable inductor 26, series resonant at about 250 megacycles per second and a second coupling network 27, 28 resonant below the lowest frequency to be received. The primary circuit is damped by means of resistors 21 and 30.

A secondary circuit 32 is connected to the primary circuit 16 and the coupling network 24 by means of a second variable tuning inductor 33 ganged to track with the tuning inductor 19 as indicated by the dotted line 34, thus forming a doubly resonant tunable input circuit. This tunable circuit is also ganged to track with a heterodyne oscillator 35 to produce an intermediate frequency signal in a manner well known. The second variable inductor 33 is connected by means of a trimming inductor 36, which is preferably similar to the trimming inductor 20, to a capacitive network comprising a trimming capacitor 37, a coupling capacitor 38 and the lumped effective input capacitance 42, shown in dotted lines, of a heterodyne mixer tube 43. The grid 44 or input electrode of the mixer tube 43 is coupled to the heterodyne oscillator 35 by means of a coupling capacitor 45. The secondary circuit 32 is damped by means of a resistor 46. The amplifier tube 14, together with the primary circuit 16, the coupling network 24 and the secondary circuit 32 form a tunably selective stage of the television receiver.

The physical structure of the network 24 outlined in broken lines in Figure 1 can be best understood by referring to Figures 2, 3, and 4.

In Figure 2 a chassis 47 is provided with cut out openings 48 and 49 leaving a bridging portion 50.

In Figures 2, 3 and 4 the circuit element shown in Figure 1 as series capacitor 25 of the network 24 is seen to consist of a two ended tab 52, having ends 53 and 54 adapted to be supported in fixed position with relation to the chassis by connection to the low impedance terminals of the ganged tuning inductors 19 and 33 respectively. A central portion 55 of the tab 52 is enclosed by a conductive member or shell 56 and insulated therefrom by means of a dielectric insulator 57, preferably comprising a layer of mica silver plated on both sides. The fixed conductive member or shell 56 which also clamps the capacitor together is thereby held in position with relation to the chassis. The tab ends 53 and 54 are preferably bent to a U form as the cross section in Figure 4 shows to provide adequate clearance and electrical isolation between the shell 56 and the bridged portion 50 of the chassis 47.

The variable inductance 26 of the network 24 comprises a rotatable conductive member 62 pivoted at 63 to the bridged portion 50 of the chassis 47 by means of a pivot and set screw 64 which engages an appropriately placed hole. The end of conductive member 62 is hook-shaped as shown at 65 and slidably in contact with the shell 56. The member is shaped with its area increasing across its overall width in this fashion to permit varying the proportion of its area in contact with 56. Tab 66 on the opposite end of the pivot portion 63 from the hook shaped portion 65 serves both as a brace and as a lever to assist in adjusting the position of the conductive member 62.

The double ended tab 52, the fixed conductive shell 56, and the rotatable member 62 are preferably made up of cold rolled steel, cadmium plated to improve their conductivity.

In the form of construction shown the self inductances of the connecting tab ends are effectively in series with the trimming inductors 20 and 36 so that variations of inductance produced by manufacturing tolerances can be compensated. This structure keeps the series resonance of the network 24 within the desired range, throughout the range of variation in self inductance and capacitance of the capacitor 25, so that by proper alignment at frequencies in the 174–216 megacycle upper television band, the coupling network will present the proper values to provide the desired bandwidth and constancy of bandwidth with tuning.

In aligning the receiver the following procedure is followed. The primary and secondary circuits are aligned with one another and with the tuning dial by means of a test signal at the low frequency end of the dial, at for instance 57 megacycles. Preferably the test signal is varied higher and lower in frequency and the output is observed on a test oscillograph. Alignment adjustments at the low frequency ends are made by means of the adjustable capacitors 22, 37. Adjustment of bandwidth at the low frequency end could be made if desired by adjusting the values of either the inductor 27 or the capacitor 28 but it has been found that adequate uniformity of bandwidth can be obtained using fixed commercial components.

Alignment of the primary and secondary circuits at the high frequency end is accomplished by means of the trimming inductors 20 and 36. The variable inductor 26 is adjusted to obtain the proper bandwidth at the high frequency end by rotating the conductive member 62 until correct bandwidth is obtained. The screw 64 is then tightened and the inductors 20 and 36 can be spotted in place if desired with a drop of solder. When tubes 14 or 43 are replaced in servicing the principal variation will be that of capacitance which will be entirely compensated for by adjustment of the capacitors 22 and 37.

Although a specific embodiment of the invention has been shown and described, the scope of my invention is as shown in the following claims.

What is claimed is:

1. In a high frequency apparatus having a conductive chassis, an adjustable resonant circuit comprising a capacitor having a plurality of capacitive conductive members arranged in fixed spaced relation to said chassis, and an elongated member of variable inductance having a pivot portion thereof rotatably affixed to said chassis and a portion of the width thereof in adjustable overlapping sliding contact with only one of said conductive members of said capacitor to provide a variable inductance.

2. The apparatus in accordance with claim 1 in which the inductive member is hook shaped to be tapered in width, having a portion thereof in sliding contact with said fixed conductive member providing variable conductive area.

3. In electrical apparatus having a conductive chassis, a high frequency series-resonant circuit comprising a conductive member in fixed position in relation to said chassis and electrically isolated therefrom, a conductive tab separated from said fixed member by means of a dielectric material, and an elongated second conductive member having a pivot portion thereof rotatably affixed to said chassis and a portion of the width thereof in sliding contact with only said first-mentioned conductive member, whereby the area of contact between said conductive members changes when said second member is rotated.

4. In a television receiver having a conductive chassis, a doubly resonant tunable input circuit comprising a primary tuned circuit containing a first variable inductance and a capacitance connected between said chassis and said inductance, a secondary circuit containing a second variable inductance and a second capacitance connected between said chassis and said second inductance, said second inductance being ganged to track with said first inductance, a two ended tab each end thereof being connected respectively to and supported in fixed position with relation to said chassis by said inductances, a fixed conductive member enclosing a central portion of said tab, said fixed member being electrically isolated from said chassis, a dielectric member between said fixed member and said tab, and a rotatable conductive member having a pivot portion thereof rotatably affixed to said chassis and a portion thereof in sliding contact with said fixed member.

5. An adjustable resonant circuit comprising a conductive frame, a first conductive member fixedly positioned and insulated with respect to said frame, a second conductive member fixedly positioned and insulated with respect to said first member in order to provide capacitance between said first and second members, an elongated conductive member pivotably attached to said frame and shaped to have a portion thereof substantially lateral to said elongation, said lateral portion being in partial overlapping adjustable sliding electrical contact with only said second conductive member to vary the area of said contact and hence vary the inductance of said elongated member, and electrical circuits connected between said frame and said first conductive member.

References Cited in the file of this patent

UNITED STATES PATENTS

| | | |
|---|---|---|
| 1,913,007 | Snow | June 6, 1933 |
| 2,075,501 | Carlson | Mar. 30, 1937 |
| 2,092,069 | Hollmann | Sept. 7, 1937 |
| 2,246,928 | Schick | June 24, 1941 |
| 2,261,879 | Higgins | Nov. 4, 1941 |
| 2,511,586 | Hubbard | June 13, 1950 |

FOREIGN PATENTS

| | | |
|---|---|---|
| 362,056 | Great Britain | Dec. 3, 1931 |